United States Patent Office

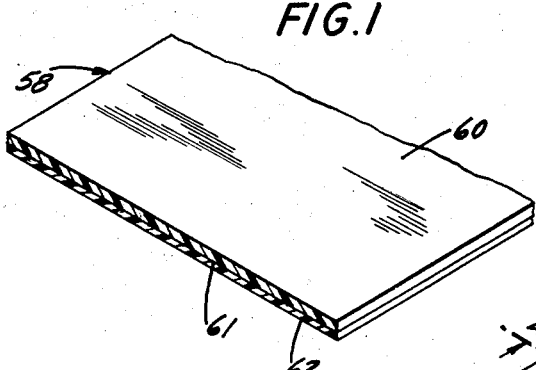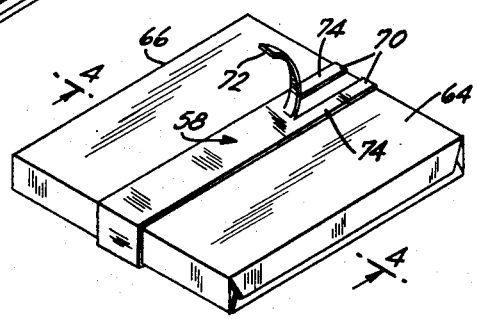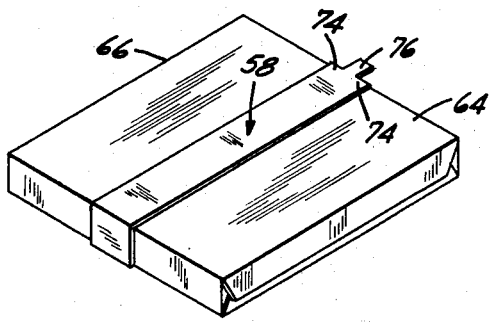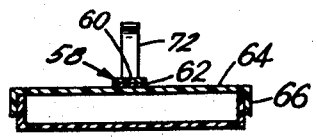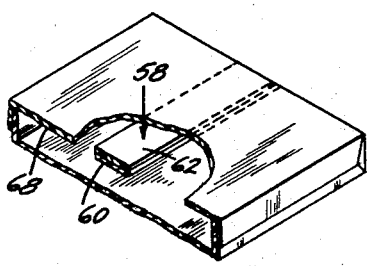
INVENTORS
WILLIAM F. UNDERWOOD
GEORGE R. COTTEN
BY
ATTORNEY June 8, 1965 W. F. UNDERWOOD ETAL 3,187,982
METHOD FOR FORMING COATED UNIAXIALLY ORIENTED FILMS
AND THE PRODUCT FORMED THEREBY
Filed July 21, 1960 2 Sheets-Sheet 2
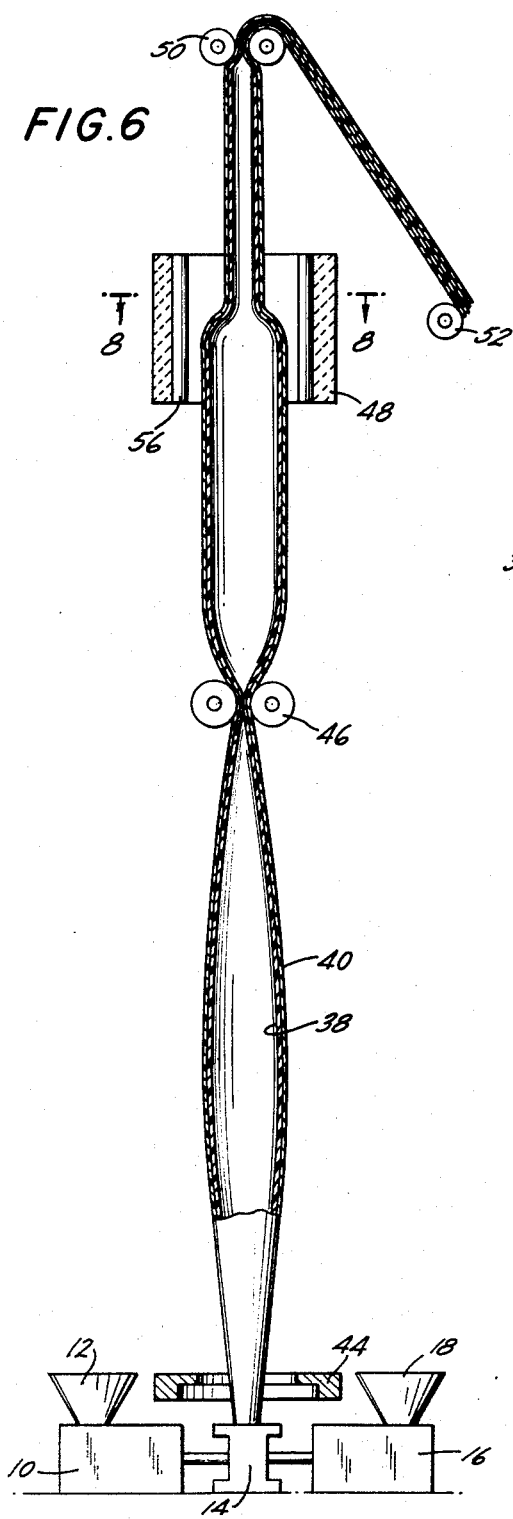
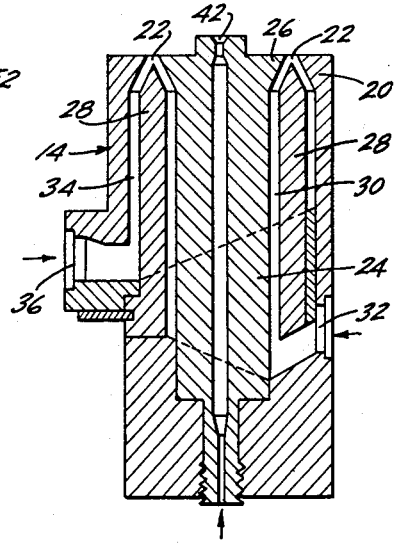
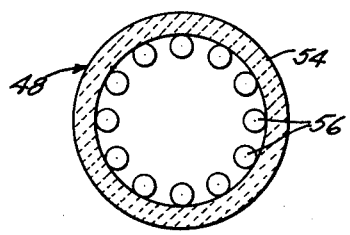
INVENTORS
WILLIAM F. UNDERWOOD
GEORGE R. COTTEN
BY
ATTORNEY

3,187,982
Patented June 8, 1965

3,187,982
METHOD FOR FORMING COATED UNIAXIALLY ORIENTED FILMS AND THE PRODUCT FORMED THEREBY
William F. Underwood, Oak Park, Ill., and George R. Cotten, Stamford, Conn., assignors to Union Carbide Corporation, a corporation of New York
Filed July 21, 1960, Ser. No. 44,294
22 Claims. (Cl. 229—51)

This invention relates to uniaxially oriented crystalline polyolefin films coated with a thermoplastic coating having a melting point less than said uniaxially oriented crystalline polyolefin films. This invention additionally relates to a method for forming the thermoplastic coated uniaxially oriented crystalline polyolefin films. More particularly, the invention relates to such thermoplastic coated uniaxially oriented crystalline polyolefin films preferably used as heat sealable tear tapes for thermoplastic packaging films.

The use of tear tapes for opening a package and the easy openability which such taps provide a package is well known. This method has found great use for packages wrapped in paper and cellophane as, for example, chewing gum and cigarettes. However, the application of known tear tapes to flexible, thermoplastic film, such as low density polyethylene film, has not been successful.

One difficulty arises because flexible thermoplastic packaging film, such as polyethylene film, is extensible and does not shear uniformly with known tear tapes. Accordingly, the known tear tapes do not tear the polyethylene packaging film in a uniform manner, but rather the tears are erratic, wandering from the desired path into the body of the wrap, thus, destroying package integrity. This results in a non-uniform serrated edge characterized by pieces of badly stretched film and uneven valleys of smoothly sheared film.

It is an object of this invention to provide a new and improved tear tape for opening thermoplastic packaging film without adversely affecting said film.

Another object of this invention is to provide a uniaxially oriented crystalline polyolefin film coated with a thermoplatsic material for use as a tear tape.

Another object of this invention is to provide a method for forming a uniaxially oriented crystalline polyolefin film coated with a thermoplastic material.

Other and additional objects will become apparent hereinafter.

According to the present invention, the tear tape comprises a backing material of highly uniaxially oriented crystalline polyolefin film and a thermoplastic coating bonded or sealed to a surface of said backing material. The thermoplastic coating has a melting point below that of the backing material and is heat sealable to a packaging film and preferably to a thermoplastic packaging film without significant distortion of the tear tape which causes unsightly and undeisrable wrinkling thereof. The tear tape of this invention is characterized in that when it is notched and pulled from the tear tape sealed area of the packaging film within the boundaries of the backing material and in the direction of orientation, it tears the packaging film conterminous therewith uniformly along a substantially straight line parallel to the direction of orientation of the backing material without wandering into the packaging film.

The film for the backing material of the tear tape is prepared from a film-forming crystalline polyolefin and oriented by preferably stretching it at least 700 percent in one direction at a temperature below the melting point of the polyolefin and above its draw point temperature. The resultant uniaxially oriented crystalline polyolefin film has a fiber-like orientation therewithin which gives it tremendous tensile strengths of the order of 30,000 pounds per square inch to 80,000 pounds per square inch in the direction of orientation.

Plastic materials suitable for the production of such uniaxially oriented backing films are preferably crystalline film-forming polyolefins having a melting point above 120° C. Polyolefins such as high density polyethylene of 0.94 and above, polypropylene, polybutene, mixtures of polyethylene and polypropylene, and copolymers of ethylene, propylene and butene can be used. Film-forming crystalline olefin polymers can also be prepared by polymerizing ethylene and/or propylene with other polymerizable monomeric olefins such as vinyl chloride and vinyl acetate.

Thermoplastic materials suitable for the heat sealable coating of the tear tape include low density film-forming polyethylene having a density of 0.93 or less and melting points of less than 115° C.

A preferred method of forming the uniaxially oriented crystalline polyolefin film with a thermoplastic coating thereon having a melting point less than said uniaxially oriented polyolefin film is by melt-extruding the thermoplastic coating material through an outer annular orifice and concurrently depositing it onto a melt of a crystalline polyolefin material simultaneously and concentrically extruded through an inner annular orifice to form seamless tubing having an outer layer of the thermoplastic coating bonded to a surface of an inner layer of crystalline polyolefin film. The tubing is continuously withdrawn and constricted at a point spaced from the point of extrusion. A bubble of a gaseous medium is maintained in the tubing between the point of extrusion and the point of constriction to distend the tubing to the desired diameter. Near the point of extrusion, the tubing is passed through a gaseous medium of such temperature as to cool the bonded layers of tubing to an extent that when the tubing has been inflated by said bubble to the determined diameter it will be in a set condition.

The uniaxial orientation of the inner crystalline layer of polyolefin tubing while preserving the bond of the outer coating layer of thermoplastic tubing thereto is then accomplished by maintaining in the tubing an isolated bubble of gaseous medium and feeding said tubing through a heated zone. The heat from said zone heats the inner crystalline polyolefin layer of tubing to a temperature above which it is drawable and below which it melts, and while in a drawable condition, it is uniaxially oriented by stretching it in the machine direction. The resultant uniaxially inner crystalline polyolefin tubing is characterized in that when a tear is initiated therein it will follow a substantially straight line parallel to the direction of orientation. Preferably, the tear in said tubing will not deviate from a straight line by an amount not greater than ½ inch per foot of tear. Concurrent with the heating and stretching of the inner crystalline polyolefin tubing, the heat from said zone heats the outer thermoplastic coating layer of tubing to a temperature above which it melts but below which it decomposes. This preferred temperature range maintains the bond of the coating layer of tubing and prevents its tendency to powder and fibrillate as the crystalline polyolefin layer of tubing is being uniaxially oriented.

The practice of this invention may be more readily understood when described with reference to the accompanying drawings, wherein the process is described with particular reference to high density polyethylene as an example of a crystalline polyolefin and low density polyethylene as an example of the thermoplastic coating material.

FIGURE 1 is a perspective view of a short length of the thermoplastic coating uniaxially oriented crystalline polyolefin film showing an exaggerated cross section thereof.

FIGURE 2 is a perspective view of a package overwrapped with thermoplastic film having a tear tape bonded to its exterior surface which has been notched and partially torn open.

FIGURE 3 is a perspective view of a package overwrapped with thermoplastic film having a tear tape bonded to its exterior surface which has a tab.

FIGURE 4 is a cross section of FIGURE 3 taken along the lines 4—4.

FIGURE 5 is a perspective view of a fragmentary portion of a package overwrapped with thermoplastic film having a tear tape bonded to its interior surface.

FIGURE 6 is a schematic illustration showing the continuous melt-extrusion of a thermoplastic coating and crystalline polyolefin film and the subsequent uniaxial orientation of the crystalline polyolefin film.

FIGURE 7 is a vertical section through the extrusion die and nozzle illustrated in FIGURE 6 showing the relationship of parts.

FIGURE 8 is a cross section of the radiant heater shown in FIGURE 7 taken along the lines 8—8.

Referring now to the drawings wherein like reference numerals designate like parts, except as otherwise indicated, and first to FIGURE 6 in which a conventional extruder 16 is provided at one end thereof with a feed hopper 18 which feeds the crystalline polyolefin, such as high density polyethylene, into the extruder screw chamber, not shown. As the high density polyethylene is fed by the screw, through the extruder 16, it is heated to a molten condition and in the molten condition fed to the die 14 secured to the extruder by appropriate means. Extruder 10 similarly provided with a hopper 12 and also attached by appropriate means to die 14 is used to feed the thermoplastic coating material, such as low density polyethylene, in a molten condition to the die 14.

The die 14 as shown in FIGURE 7 is comprised of an outer housing or shell 20 which terminates at an annular orifice 22. A die insert 24 is positioned and maintained in spaced relationship within the outer housing 20. The die insert 24 has an outwardly flaring cylindrical extension 26 cooperating with the outer housing 20 to form the annular orifice 22 and a dividing ring 28. The annular dividing ring 28 is spaced from an annular channel 30. The annular channel 30 terminates at the interior end of orifice 22. The other end of channel 30 is connected to a supply source from the extruder 16 by means of opening 32. The dividing ring 28 is also spaced from the inner surface of the housing 20 to provide a second annular channel 34 which terminates at the interior end of orifice 22 and is supplied with molten plastic by extruder 10 by means of opening 36.

The dividing ring 28 separates the annular channels 30 and 34 up to a point of convergence in close proximity to the entrance to orifice 22. This allows the flow of thermoplastic materials in a molten condition from the two channels to converge and form two concentric tubes and to emerge in such form from annular orifice 22 with the outer tube 40 bonded to the inner tube 38. The bonded concentric tubes 38 and 40 after emergence are shown in FIGURE 6. The die insert 24 is provided with a central orifice 42 connected to a supply of a gaseous medium, not shown, whereby the seamless tubing is inflated by introducing the gaseous medium, such as air, into the interior thereof in sufficient quantity to inflate the seamless tubing to the desired diameter. The gas supply is provided with a valve not shown so that when the desired quantity of gas has been introduced within the seamless tubing, further supply thereof can be prevented. In the event the quantity of gas decreases as for example by leakage or otherwise, the requisite quantity of gas can be added by proper manipulation of the valve.

Referring again to FIGURE 6, the bonded and inflated concentric tubes 38 and 40 are drawn vertically upward from the die 14 by a pair of counter-rotating squeeze rolls 46 and through a cooling zone 44 which serves to chill and set the expanding concentric tubes at a point where they have reached the desired diameter. The set concentric tubes after passing between the nip of the squeeze rolls 46 are fed into the orientation zone.

The uniaxial orientation of the inner crystalline polyolefin tube 38 while maintaining the bond of the outer thermoplastic tube 40 thereto is then accomplished by drawing the bonded concentric layers of seamless tubing from the squeeze rolls 46 vertically upward through a heating device 48 by a pair of counter-rotating squeeze rolls 50. A bubble of gaseous medium, such as air, is maintained within the tubing between the pair of squeeze rolls 46 and 50 to prevent the concentric layers of seamless tubing from collapsing. In such heated device 48, the inner tube 38 is heated to a temperature above which it becomes drawable and orients when stretched but below which it merely thins out when stretched, preferably 5° C. to 25° C. below its melting point. The peripheral speed of the squeeze rolls 50 is desirably sufficiently greater than that of the squeeze rolls 46 to stretch the inner crystalline polyolefin tubing at least 700 percent for orientating it in the machine direction while in its drawable condition.

Concurrently such heating device 48 preferably heats the outer thermoplastic tube 40 to a temperature above which it melts and below which it decomposes to preserve the bond of the outer layer 40 and prevents its tendency to powder and fibrillate while the inner crystalline polyolefin tubing 38 is being uniaxially oriented. The thermoplastic coated highly uniaxially oriented crystalline polyolefin tubing is then collapsed by the squeeze rolls 50 as it is drawn therebetween. After passing through the squeeze rolls 50 the uniaxially oriented crystalline polyolefin tubing coated with the thermoplastic tubing is on wind up reel 52.

The heating device 48 as illustrated in FIGURE 8 essentially comprises a tubular core 54 and a series of resistance elements 56 equally spaced about the inner periphery thereof and controlled by a known transformer type control (not shown). The internal diameter of the core 54 is sufficiently large to allow the tubing in its inflated condition to pass therethrough with clearance. The measured temperatures used in the process are obtained by means of a thermocouple placed in the heating device and held in contact with the outside surface of the seamless tubing at its draw point. Although the process has been described using radiant heating, other means of heating, such as infra-red, hot air, dielectric heating, and steam, for example, can also be employed.

It is to be noted that the factors affecting the amount of stretch and orientation in the machine direction of the tubing 38 in general include the ratio of peripheral speeds of squeeze rolls 46 to squeeze rolls 50, commonly called the draw ratio, and the temperature to which the tubing is subjected. Furthermore, in its passage through the heating device 48, the inner crystalline polyolefin tubing 38 becomes drawable and stretches in the machine direction at a well defined point herein referred to as the draw point. The horizontal axis of the draw point will tend to rise upwardly in the heating device if the temperature is lowered or if the linear velocity of the tubing through the heater is increased. Conversely, the horizontal axis of the draw point will be lowered if the temperature is raised or the linear velocity of the film through the heater is decreased.

Crystalline polyolefin films such as films formed from high density polyethylene, become drawable and properly orient when stretched within a narrow temperature range. For stretching crystalline polyethylene tubing having a high density of 0.94 to 0.98 the desired results are obtained by heating the crystalline polyethylene tubing to a preferred temperature in the range from about 5° C. to 25° C. below its melting point. Stretching the crystalline polyethylene tubing in the machine direction at a temperature of about 25° C. below its melting point, results in irregular orientation of the tubing leaving areas that are unoriented. Stretching the crystalline polyethylene tubing in the machine direction at temperatures above its melting point results in mere thinning out of the tubing without substantial orientation occurring.

To obtain the desired uniaxial orientation, the crystalline polyolefin film is preferably stretched in the machine direction at least 700 percent. The optimum stretch in the machine direction will be dependent on such factors as the nature of the crystalline polyolefin used for forming the film, the temperature of the film when it is oriented, the prior orientation history of the film, the tensile strength of the film, and the apparatus used for stretching.

In the embodiment wherein a highly uniaxially oriented film is prepared from polyethylene having a density of 0.96, it is preferred to stretch the film at least 900 percent. It was found that stretching the film at least 900 percent or greater produced a film which is clear and glossy. Stretching the film 700 percent produced a film which had appreciable haziness. However, the film, when stretched 700 percent, nevertheless produced a satisfactory tear tape. In the case of crystalline polyethylene having a density of 0.96, it was found that after the film had been oriented to produce a satisfactory tear tape, further orientation of the film resulted in increased machine directional tensile strength and improved gloss.

The preferred minimum amount of uniaxial stretching is such that the resultant thermoplastic coated crystalline highly oriented polyolefin film pass the following tests when used as a tear tape. When the tear is initiated in the direction of stretch it will not deviate from a straight line by an amount not greater than ½ inch per foot of tear. In contrast, when the film is not fully oriented, there will be a sudden resistance to the tearing action. Increased force will cause the tear to deviate from the initiated straight line and the tear then may or may not continue along the deviated line.

Plastic materials suitable for the production of such uniaxially oriented backing films are preferably crystalline film-forming polyolefins having a melting point above 120° C. Polyolefins such as high density polyethylene of 0.94 and above, polypropylene, polybutene, mixtures of polyethylene and polypropylene, and copolymers of ethylene, propylene and butene can be used. Film-forming polymers can also be prepared by polymerizing ethylene and/or propylene with other polymerizable monomeric olefins such as vinyl chloride and vinyl acetate.

With respect to preserving the bond between the two concentric layers of tubing 38 and 40 while uniaxially stretching the crystalline polyolefin layer it is preferred to heat the thermoplastic coating layer to a temperature above its melting point and below its degradation point. For low density polyethylene of 0.93 or less and melting points of less than 115° C., heating the polyethylene coating as it passes through the heating device 48 of FIGURE 6 to a temperature below its melting point results in either a tendency of the polyethylene coating to powder and fibrillate instead of adhering to the crystalline polyolefin film as it is being oriented or results in poor adhesion to the crystalline polyolefin film with separation of the two layers occurring upon stretching.

The thermoplastic material selected as a coating for the highly uniaxially oriented crystalline polyolefin film should have a melting point less than that of the uniaxially oriented crystalline polyolefin film and it should have excellent adhesion to said uniaxially oriented film. If the thermoplastic coated uniaxially oriented crystalline polyolefin film is to be used as a tear tape then the thermoplastic coating should also be heat sealable to the packaging material.

The details and manner of practicing the preferred method of the invention will become apparent from the following example, it being understood that the example is illustrative thereof and that the scope of the invention is not restricted thereto other than as set forth in the appended claims.

EXAMPLE

A thermoplastic coated uniaxially oriented crystalline polyolefin tubular film was formed by using apparatus as illustrated in FIGURES 6 and 7 of the drawings. A film-forming polyethylene resin having a density of 0.92 and a melt index of 1.8 at a temperature of 190° C. was fed through the hopper of the extruder which supplied the outer channel of the die and was extruded conjointly with a film-forming polyethylene resin having a density of 0.96 and a melt index of 0.2 at a temperature of 190° C. being simultaneously fed through the extruder which supplied the inner channel of the die. The die had an annular orifice of 0.050 inch with each channel opening being 0.025 inch. The diameter between the die inner lips was 1.5 inches. The temperature of the die during extrusion was about 205° C. The composite concentric tubes with the outer tube tenaciously adhering to the inner tube were withdrawn in a vertically upward direction from the die at the rate of 23 feet per minute by the squeeze rolls positioned above the die. Sufficient air was introduced interiorly to inflate the concentric tubes to a final diameter sufficient to produce a tubing of 2 inches flat width and an average thickness of 10 mils for each concentric tube. As the molten concentric tubes issued from the die, they began to expand due to the gaseous bubble confined therein. The expanding concentric tubes were then passed through a cooling zone and drawn upwardly by the draw rolls and after passing through the nip thereof fed into the orientation zone. The uniaxial orientation of the inner crystalline polyolefin tube while preserving the bond of the outer thermoplastic coating tube thereto was then accomplished by drawing the concentric tubes vertically upward from the squeeze rolls through a radiant heating device by another pair of squeeze rolls positioned thereabove. A bubble of air was maintained within the thermoplastic coated crystalline polyolefin tubular film between the pairs of squeeze rolls to prevent it from collapsing. The draw ratio of the squeeze rolls above the heating device to the squeeze rolls therebelow was 10. This caused the inner crystalline polyolefin tubular film of high density polyethylene to be stretched 900 percent and thus highly orient in the machine direction as it reaches its draw point within the heating device. At such temperature the adhesion of the outer low density polyethylene coating to the inner high density polyethylene film was also maintained. The thermoplastic coated highly uniaxially oriented crystalline polyolefin film was then flattened by the second pair of squeeze rolls and wound upon a reel. Such film was 0.75 inch in flat width and both the coating and uniaxially oriented layers had an average thickness of 7.5 mils. The thermoplastic coated highly uniaxially oriented high density polyethylene film in the machine direction had a tensile strength of 42,400 pounds per square inch and elongated 75 percent at the breaking point.

Although it is preferred to form the thermoplastic coated highly uniaxially oriented crystalline polyolefin film in a continuous process as herein described, the concentric layers of seamless tubing can be formed by the described double wall extrusion method and after leaving the squeeze rolls 46 wound on a wind up reel, not shown. Then the thermoplastic coated highly uniaxially oriented crystalline polyolefin film can be formed some time later by simply unwinding the concentric layers of seamless tubing and proceeding with the appropriate orientation steps of the process herein described.

It is to be noted that the concentric layers of seamless tubing can be formed by extruding the thermoplastic coating material from the inner channel of the die and concurrently deposited on to a melt of a crystalline polyolefin material simultaneously and concentrically extruded from the outer channel of said die. In such manner the thermoplastic coating could be applied to the inner surface of the crystalline polyolefin tubing. Crystalline polyolefin film can also be formed having a thermoplastic coating material bonded to both its surfaces.

In addition the thermoplastic coated crystalline film can formed by other methods which are known in the art. Thus, the crystalline polyolefins can be formed into film by such methods as slot extrusion and solvent casting. Thereafter the crystalline polyolefin film can be preferably stretched at least 700 percent in the machine direction such as spaced rolls or drums driven at differential speeds. Furthermore, the thermoplastic coating can be applied to one surface or both surfaces of the highly uniaxially oriented polyolefin film by any method known to those in the art, such as by applying the thermoplastic coating as an emulsion composition, as a solvent composition, laminating the thermoplastic coating to the oriented film and coating the uniaxially oriented film by the melt extrusion technique.

However, forming the thermoplastic coated highly uniaxially oriented crystalline polyolefin by the preferred method, herein described, has certain advantages over the known methods. First with the preferred method the entire crystalline polyolefin tubing can be oriented without any loss due to edge trimming as would be the case in either the two roll stretch method or the tentering apparatus stretch method. Secondly, the preferred method of orientation of the crystalline polyolefin tubing can be used in a continuous process in conjunction with the economical blown tube extrusion method.

After the highly uniaxially oriented crystalline polyolefin tubing 38 having a thermoplastic coating 40 thereon is formed it can be slit into strips by any suitable means not shown. The width of the strips, of course, is largely dependent on its application.

Referring to FIGURES 1–5 and the first to FIGURE 1 wherein is shown the preferred application of the thermoplastic coated highly uniaxially oriented film as a tear tape 58 for a packaging film comprising a crystalline polyolefin backing film 60 highly oriented in the machine or longitudinal direction, and a thermoplastic coating 62 bonded to a surface 61 thereof which is directly heat sealable to said packaging film.

The tear tape 58 is characterized in that when it is notched and pulled from the tear tape sealed area of the packaging film within the boundaries of the highly uniaxially oriented crystalline polyolefin film 60 and in the direction of orientation, it tears the packaging film conterminous therewith uniformly along a substantially straight line parallel to the direction of orientation of said backing film without wandering into the packaging film. Such tear tape 58 readily passes the test herein described in that when a tear is initiated in the direction of orientation it does not deviate from a straight line more than ½ inch per foot of tear.

To prevent significant distortion or wrinkling of the thermoplastic packaging film, the thermoplastic coating 62 has a melting point preferably below that of the backing film 60 and substantially in the same range as the thermoplastic packaging film and is heat sealed directly thereto by suitable means, not shown. Furthermore, the melting point of the thermoplastic coating 62 is below that of the backing film 60 because it was found heating the backing film to near its melting point results in loss of orientation.

The highly uniaxially oriented backing film 60 has fiber-like orientation and great strength, i.e. 30,000 pounds to 80,000 pounds per square inch in the oriented direction, making it substantially less extensible than the thermoplastic films suitable for use as packaging film.

In a preferred embodiment, the tear tape 58 consists of a uniaxially oriented high density polyethylene backing film 60, and a low density polyethylene coating 62 having a melting point in the same range as the packaging film to which the coating 62 will be heat sealed, and both from about 5° C. to 25° C. lower than the melting point of said backing film 60. Preferably, the packaging film is made from film-forming low density polyethylene as from .91 to .925. A conventional impulse bar sealer can be employed to heat seal the tear tape to the packaging film wherein the dwell time and temperature of the impulse bar sealer are regulated to form a satisfactory seal.

As shown in FIGS. 2 and 3, a tear tape 58 as above described, has been applied to the exterior surface 64 of a low density polyethylene packaging film 66 with the coating 62 heat sealed directly to the surface 64 as shown in FIG. 4 by the conventional impulse bar sealer. FIG. 5 illustrates a tear tape 58 as above described which can be heat sealed to the interior surface 68 of the low density polyethylene packaging film 66. However, as in FIG. 4, the coating 62 must be in direct contact with the packaging film 66, otherwise distortion will occur. Of course, in all embodiments of the invention, the tearing action through the packaging film 66 effected by the tear tape 58 is along the line of orientation of the backing film 60.

Referring again to FIG. 2 which shows the tearing action of the tear tape 58 on the packaging film 66 when it has been notched at 70 by means of a sharp instrument as a pair of scissors. Accordingly, pulling the tear tape strip 72 lying within the notches 70 upwardly and towards the opposite end of the package lifts such strip 72 and that portion of the packaging film 66 conterminous therewith from the plane of such film 66 in a highly uniform manner leaving a neat, nearly straight edge tear in the wrapping film 66. The tear guides 74 on either side of the tear strip 72 and integral therewith, prevent random tearing of the packaging film, and thus assists in preserving the integrity of the package.

FIG. 3 shows a package overwrapped with a thermoplastic film having the tear tape 58 with a tab 76. To open the package the tab 76 is pulled up and towards the opposite end of the package. By such action, a neat, nearly straight edge tear will be formed in the wrapping film as in the embodiment shown in FIG. 2. Integral tear guides 74 on either side of the tear tape tab 76 insure that package integrity will be maintained.

The tear tapes of this invention can be colored as by pigmenting or dyeing and the surfaces of these tear tapes can be metallized before or after orientation. Furthermore, the tapes of this invention may be treated before or after orientation by any method known in the art such as, by way of example, flame treatment, ozone treatment, corona discharge treatment and chlorination.

While the packaging material in the foregoing embodiments has been exemplified by the low density polyethylene film, other packaging materials can also be employed including thermoplastic films such as high density polyethylene fibrous cellulose materials, such as paper, and non-fibrous films such as moisture-proof coated regenerated cellulose. Of course, any of the plastic materials suitable for the production of coated highly uniaxially oriented film can also be employed as a tear tape.

In addition to being ideally suited for a tear tape, such properties as a fiber-like orientation, tremendous tensile strength in the oriented direction, low extensibility and less tendency to fibrillate make the thermoplastic coated uniaxially oriented crystalline film admirably suited for making rope, cordage, magnetic tapes and pressure sensitive tapes. Of course, the coated uniaxially oriented film may have to be further processed for these other applications. For example, as a pressure sensitive tape the coated film must be slit to the desired widths and have known adhesives applied to either the uncoated surface of the thermoplastic coating or the uncoated surface of the uniaxially oriented crystalline polyolefin film.

It is to be noted that the crystalline polyolefin film is preferably stretched in the longitudinal direction at least 700 percent, and desirably 800 percent or greater. The resultant uniaxially oriented film is not restricted to any thickness nor to any given width, but is largely dependent on its intended application. Furthermore, the crystalline polyolefin film can be oriented immediately after extrusion or it can be wound upon a reel and oriented later, or if a small amount of transverse strength is desired, the crystalline polyolefin film can be oriented in this direction prior to its being highly oriented in the machine direction. Crystalline polyolefin film to be highly uniaxially oriented may or may not be irradiated.

In the case wherein the highly uniaxially oriented film is coated with a low melting polyolefin, such as low density polyethylene, the highly uniaxially oriented film should have a melting point higher than that of the polyolefin coating and the uniaxially oriented film when notched or the like should produce a tear with straight smooth paralleled edges.

The following is a glossary of terms employed throughout the present specification:

*Melt index.*—ASTM Test D 1238–52T; ASTM Standards, 1952, Part 6, p. 735. The flow rate is rate of extrusion in grams per 10 minutes (unless otherwise explicitly indicated).

*Tensile strength.*—ASTM Test D–882–54T–C; ASTM Standards of Plastics, October 1955, p. 222, Scott Inclined Plane Tensile Strength Tester. A sample one inch long by ½ inch is used. Tensil Strength is given in pounds per square inch based on original cross-section area of the sample.

*Melting point.*—Melting point is temperature at which the film will lose its birefringence when observed between crossed Nichol prisms on a hot stage microscope.

*Elongation.*—ASTM Test D–882–54T–C; ASTM Standard on Plastics, October 1955, p. 222. Determined on same machine and sample as tensile strength.

*Temperature*—Temperature of the tubing at the draw point was measured by means of a thermocouple placed within the heating device and held in contact with the outer surface of the tubing at said draw point.

*Density.*—Of the crystalline polyolefin and the thermoplastic coating material was measured in grams per cubic centimeter in a gradient column made up of water, methanol and sodium acetate at 25° C.

*Draw Ratio*

Draw ratio = $\dfrac{\text{Output speed of film}}{\text{Input speed of film}}$

Percent stretch = $\dfrac{\text{Output speed} - \text{input speed}}{\text{Input speed}}$ The speeds the film travels are those on entry into the orientation zone (input speed) and on exit from the orientation zone (output speed).

Since it is obvious that various changes and modification may be made in the foregoing description without departing from the nature and spirit thereof, it is to be understood that the invention is not limited thereto except as set out in the appended claims.

We claim:

1. A tear tape for producing a uniform tear in a thermoplastic packaging film comprising a backing film of highly uniaxially oriented crystalline polyolefin film stretched at least 700% in the longitudinal direction, and a thermoplastic coating bonded to a surface of said backing film and heat sealed to said thermoplastic packaging film at a temperaure less than the melting point of said backing film, said tear tape being characterized in that when a tear is initiated within boundaries of said backing film and in the direction of orientation it will uniformly tear along a substantially straight line parallel to the direction of orientation.

2. The package claimed in claim 1 in which said thermoplastic coating of the tear tape is heat sealable to the thermoplastic packaging film at a temperature from about 5° C. to 25° C. below the melting point of said backing film.

3. A packaging material comprising a thermoplastic packaging film, and a tear tape having a uniaxially oriented crystalline polyolefin backing film and a thermoplastic coating bonded to a surface of said backing film and heat sealed to said thermoplastic packaging film at a temperature less than the melting point of said backing film, said tear tape being characterized in that when a tear is initiated within the boundaries of said backing film and in the direction of orientation it will uniformly tear along a substantially straight line parallel to the direction of orientation.

4. In a package, a thermoplastic wrapping film, and a tear tape comprising a backing material of highly uniaxially oriented crystalline polyolefin film and a thermoplastic coating bonded to a surface of said backing material and heat sealed to said thermoplastic wrapping film, said tear tape being characterized in that when a tear is initiated within the boundaries of said backing material and in the direction of orientation it will uniformly tear along a substantially straight line parallel to the direction of orientation.

5. In a package, a low density polyethylene wrapping film, and a tear tape comprising a backing material of highly uniaxially oriented high density polyolefin film, and a low density polyethylene coating bonded to a surface of said backing material and heat sealed to said wrapping film below the melting point of said backing material, said tear tape being characterized in that when a tear is initiated within the boundaries of said backing material and in the direction of orientation it will uniformly tear along a substantially straight line parallel to the direction of orientation.

6. A pressure sensitive tape comprising a backing material of a highly uniaxially oriented crystalline polyolefin film, a thermoplastic coating bonded to one surface of said backing material, and a pressure-sensitive adhesive on the other surface of said backing material, said backing material being characterized in that when a tear is initiated within its boundaries and in the direction of orientation it will uniformly tear along a substantially straight line parallel to the direction of orientation.

7. A pressure sensitive tape comprising a backing material of a highly uniaxially oriented crystalline polyolefin film, a thermoplastic coating bonded to one surface of said backing material, and a pressure-sensitive adhesive on the surface of said thermoplastic coating remote from the backing material, said backing material being characterized in that when a tear is initiated within its boundaries and in the direction of orientation it will uniformly tear along a substantially straight line parallel to the direction of orientation.

8. The method which comprises passing a continuous length of double wall seamless tubing of a crystalline polyolefin film and a thermoplastic coating bonded to a surface of and having a melting point less than said crystalline polyolefin film through a heated zone while simultaneously introducing and maintaining in said seamless tubing a continuous isolated bubble of a fluid medium to prevent the seamless tubing from collapsing, and stretching the crystalline polyolefin film in the longitudinal direction to cause orientation thereof in said direction, the heat in said zone maintaining the temperature of the thermoplastic coating above its melting point and below its degradation point to preserve the bond of said thermoplastic coating to the crystalline polyolefin film and maintaining the temperature of the crystalline polyolefin film below which it melts and above which it is drawable to cause the uniaxial orientation thereof, said uniaxially oriented crystalline polyolefin film being characterized in that when a tear is initiated therein it will follow a substantially straight line parallel to the direction of orientation.

9. The method which comprises passing a continuous length of double wall seamless tubing of a crystalline polyolefin film and a thermoplastic coating bonded to a surface of and having a melting point less than said crystalline polyolefin film through a heated zone while simultaneously introducing and maintaining in said seamless tubing a continuous isolated bubble of a fluid medium to prevent the seamless tubing from collapsing and stretching the crystalline polyolefin film in the longitudinal direction to cause orientation thereof in said direction, the heat in said zone maintaining the temperature of the thermoplastic coating above its melting point and below its degradation point to preserve the bond of said thermoplastic coating to the crystalline polyolefin film and maintaining the temperature of the crystalline polyolefin film below which it melts and above which it is drawable to cause the uniaxial orientation thereof, said uniaxially oriented crystalline polyolefin film being characterized in that when a tear is initiated therein it will deviate from a straight line not more than ½ inch per foot of tear.

10. The method which comprises passing a continuous length of double wall seamless tubing of a crystalline polyolefin film and a thermoplastic coating bonded to a surface of and having a melting point less than said crystalline polyolefin film through a heated zone while simultaneously introducing and maintaining in said seamless tubing a continuous isolated bubble of a fluid medium to prevent the seamless tubing from collapsing, and stretching the crystalline polyolefin film in the longitudinal direction to cause high orientation thereof in said direction, the heat in said zone maintaining the temperature of the thermoplastic coating above its melting point and below its degradation point to preserve the bond of said thermoplastic coating to the crystalline polyolefin film and maintaining the temperature of the crystalline polyolefin film below which it melts and above which it is drawable to cause the uniaxial orientation thereof.

11. The method which comprises passing a continuous length of double wall seamless tubing of a crystalline polyolefin film and a thermoplastic coating bonded to a surface of and having a melting point less than said crystalline polyolefin film through a heated zone while simultaneously introducing and maintaining in said seamless tubing a continuous isolated bubble of a fluid medium to prevent the seamless tubing from collapsing, and stretching the crystalline polyolefin film at least 700% in the longitudinal direction to cause orientation thereof in said direction, the heat in said zone maintaining the temperature of the thermoplastic coating above its melting point and below its degradation point to preserve the bond of said thermoplastic coating to the crystalline polyolefin film and maintaining the temperature of the crystalline polyolefin film below which it melts and above which it is drawable to cause the uniaxial orientation thereof.

12. The method which comprises passing a continuous length of double wall seamless tubing of a high density polyethylene film and a thermoplastic coating bonded to a surface of and having a melting point less than said high density polyethylene film through a heated zone while simultaneously introducing and maintaining in said seamless tubing a continuous isolated bubble of a fluid medium to prevent the seamless tubing from collapsing, and stretching the high density polyethylene film at least 700% in the longitudinal direction to cause orientation thereof in said direction, the heat in said zone maintaining the temperature of the thermoplastic coating above its melting point and below its degradation point to preserve the bond of said thermoplastic coating to the high density polyethylene film and maintaining the temperature of the high density polyethylene film below which it melts and above which it is drawable to cause the uniaxial orientation thereof.

13. The method which comprises passing a continuous length of double wall seamless tubing of a high density polyethylene film and a low density polyethylene coating bonded to a surface of and having a melting point less than said high density polyethylene film through a heated zone while simultaneously introducing and maintaining in said seamless tubing a continuous isolated bubble of a fluid medium to prevent the seamless tubing from collapsing, and stretching the high density polyethylene film at least 700% in the longitudinal direction to cause orientation thereof in said direction, the heat in said zone maintaining the temperature of the low density polyethylene coating above its melting point and below its degradation point to preserve the bond of said low density polyethylene coating to the high density polyethylene film and maintaining the temperature of the high density polyethylene film below which it melts and above which it is drawable to cause the uniaxial orientation thereof.

14. The method which comprises passing a continuous length of double wall seamless tubing of a film consisting of film-form polyethylene having a density of 0.96 and a thermoplastic coating bonded to a surface of and having a melting point less than said film through a heated zone while simultaneously introducing and maintaining in said seamless tubing a continuous isolated bubble of a fluid medium to prevent the seamless tubing from collapsing, and stretching said film at least 900% in the longitudinal direction to cause orientation thereof in said direction, the heat in said zone maintaining the temperature of the thermoplastic coating above its melting point and below its degradation point to preserve the bond of said thermoplastic coating to said film and maintaining the temperature of said film below which it melts and above which it is drawable to cause uniaxial orientation thereof.

15. In a method for forming a uniaxially oriented crystalline polyolefin film having a thermoplastic coating bonded thereto, the steps which comprise melt-extruding the thermoplastic coating through an annular orifice and depositing it onto a melt of a highly crystalline polyolefin material simultaneously and concentrically extruded through an annular orifice to form seamless tubing with the thermoplastic coating film bonded to a surface of the highly crystalline polyolefin film; continuously withdrawing the seamless tubing from the point of extrusion; flattening the seamless tubing at a point spaced from the point of extrusion while maintaining a bubble of fluid medium under pressure in the tubing between the point of extrusion and the point of flattening to cause distention thereof; passing a continuous length of the formed seamless tubing through a heated zone while simultaneously introducing and maintaining in the seamless tubing a continuous isolated bubble of a fluid medium to prevent the seamless tubing from collapsing and stretching said crystalline polyolefin film in the longitudinal direction to cause high orientation thereof in said direction; the heat in said zone maintaining the temperature of the thermoplastic coating above its melting point and below its degradation point to preserve its bond to crystalline polyolefin film and maintaining the temperature of the crystalline polyolefin film below which it melts and above which it is drawable to cause the uniaxial orientation.

16. In a method for forming a uniaxially oriented crystalline polyolefin film having a thermoplastic coating bonded thereto, the steps which comprise melt-extruding the thermoplastic coating through an outer annular orifice and depositing it onto a melt of a highly crystalline polyolefin material simultaneously and concentrically extruded through an inner annular orifice to form seamless tubing with the thermoplastic coating bonded to the outer surface of the highly crystalline polyolefin film; continuously withdrawing the seamless tubing from the point of extrusion; flattening the seamless tubing at a point spaced from the point of extrusion while maintaining a bubble of a fluid medium under pressure in the tubing between the point of extrusion and the point of flattening to cause distention thereof; passing a continuous length of the formed seamless tubing through a heated zone while introducing and maintaining in the seamless tubing a bubble of fluid medium to prevent the seamless tubing from collapsing, and stretching said crystalline polyolefin film at least 700% in the longitudinal direction to cause high orientation thereof in said direction, the heat in said zone maintaining the temperature of the thermoplastic coating above its melting point and below its degradation point to preserve its bond to the crystalline polyolefin film, and maintaining the temperature of the layer of crystalline polyolefin film below which it melts and above which it is drawable to cause the uniaxial orientation.

17. In a method for forming a uniaxially oriented high density polyethylene film having a thermoplastic coating bonded thereto, the steps which comprise melt-extruding the thermoplastic coating through an outer annular orifice and depositing it onto a melt of a high density polyethylene material simultaneously and concentrically extruded through an inner annular orifice to form seamless tubing wherein the thermoplastic coating film is bonded to the outer surface of the highly density polyethylene film, continuously withdrawing the seamless tubing from the point of extrusion, flattening the seamless tubing at a point spaced from the point of extrusion while maintaining a bubble of a fluid medium under pressure in the tubing between the point of extrusion and the point of flattening to cause distention thereof, passing a continuous length of the formed seamless tubing through a heated zone while simultaneously introducing and maintaining in the seamless tubing a continuous isolated bubble of a fluid medium to prevent the seamless tubing from collapsing, and stretching the high density polyethylene film at least 700% in the longitudinal direction to cause high orientation thereof in said direction, the heat in said zone maintaining the temperature of the thermoplastic coating above its melting point and below its degradation point to preserve its bond to the high density polyethylene film and maintaining the temperature of the high density polyethylene film below which it melts and above which it is drawable to cause uniaxial orientation.

18. The method which comprises passing a continuous length of double wall seamless tubing of an orientable polyolefin film and a thermoplastic coating bonded to a surface of and having a melting point less than said film through a heated zone while simultaneously introducing and maintaining in said seamless tubing a continuous isolated bubble of a fluid medium to prevent the seamless tubing from collapsing, and stretching the polyolefin film in the longitudinal direction to cause orientation thereof in said direction, the heat in said zone maintaining the temperature of the thermoplastic coating above its melting point and below its degradation point to preserve the bond of said thermoplastic coating to the polyolefin film and maintaining the temperature of the film from about 5° C. to 25° C. below the temperature at which it melts and above the temperature which it is drawable to cause the uniaxial orientation thereof, said uniaxially oriented polyolefin film being characterized in that when a tear is initiated therein it will follow a substantially straight line parallel to the direction of orientation.

19. The method which comprises passing a continuous length of double wall seamless tubing of high density polyethylene film and a thermoplastic coating bonded to a surface of and having a melting point less than said polyethylene film through a heated zone while simultaneously introducing and maintaining in said seamless tubing a continuous isolated bubble of a fluid medium to prevent the seamless tubing from collapsing and stretching the polyethylene film in the longitudinal direction to cause orientation thereof in said direction, the heat in said zone maintaining the temperature of the thermoplastic coating above its melting point and below its degradation point to preserve the bond of said thermoplastic coating to the polyethylene film and maintaining the temperature of the polyethylene film from about 5° C. to 25° C. below the temperature at which it melts and above the temperature at which it is drawable to cause the longitudinal orientation thereof, said longitudinally oriented polyethylene film being characterized in that when a tear is initiated therein it will deviate from a straight line not more than ½ inch per foot of tear.

20. In a method for orienting polyolefin film having a thermoplastic coating bonded thereto, the steps which comprise melt-extruding the thermoplastic coating through an annular orifice and depositing it onto a melt of a polyolefin material simultaneously and concentrically extruded through an annular orifice to form seamless tubing with the thermoplastic coating film bonded to a surface of the polyolefin film; continuously withdrawing the seamless tubing from the point of extrusion, flattening the seamless tubing between a pair of rollers at a point spaced from the point of extrusion while maintaining a bubble of fluid medium under pressure in the tubing between the point of extrusion and the point of flattening to cause distention thereof; cooling said seamless tubing between said point of extrusion and the point of flattening to cause the tubing to attain a set condition; passing a continuous length of the formed seamless tubing through a heated zone while simultaneously introducing and maintaining in the seamless tubing a continuous isolated bubble of a fluid medium to prevent the seamless tubing from collapsing; passing the heated tubing between a pair of rollers; maintaining a draw ratio between the two pairs of rollers such that the polyolefin film is stretched in the longitudinal direction to cause high orientation thereof in said direction; the heat in said zone maintaining the temperature of the thermoplastic coating above its melting point and below its degradation point to preserve its bond to the polyolefin film and maintaining the temperature of the polyolefin film below the temperature at which it melts and above which it is drawable to cause the orientation.

21. In a method for forming oriented crystalline polyolefin film having a thermoplastic coating bonded thereto, the steps which comprise melt-extruding the thermoplastic coating through an outer annular orifice and depositing it onto a melt of a polyolefin material simultaneously and concentrically extruded through an inner annular orifice to form a seamless tubing with the thermoplastic coating bonded to the outer surface of the polyolefin film; continuously withdrawing the seamless tubing from the point of extrusion, flattening the seamless tubing between a pair of rollers at a point spaced from the point of extrusion while maintaining a bubble of a fluid medium under pressure in the tubing between the point of extrusion and the point of flattening to cause distention thereof; cooling said tubing between the point of extrusion and the point of flattening to set said tubing in the distended condition; passing a continuous length of the set, formed seamless tubing through a heated zone while introducing and maintaining in the seamless tubing a bubble of fluid medium to prevent the seamless tubing from collapsing; passing the heated tubing between a pair of rollers and stretching said crystalline polyolefin film between the two pairs of rollers, at least 700% in the longitudinal direction to cause high orientation thereof in said direction, the heat in said zone maintaining the temperature of the thermoplastc coating above its melting point and below its degradation point to preserve its bond to the polyolefin film, and maintaining the temperature of the layer of polyolefin film below which it melts and above which it is drawable to cause the longitudinal orientation.

22. In a method for forming oriented high density polyethylene film having a thermoplastic coating bonded thereto, the steps which comprise melt-extruding the thermoplastic coating through an outer annular orifice and depositing it onto a melt of a high density polyethylene material simultaneously and concentrically extruded through an inner annular orifice to form seamless tubing wherein the thermoplastic coating film is bonded to the other surface of the highly density polyethylene film, continuously withdrawing the seamless tubing from the point of extrusion; flattening the seamless tubing between a pair of rollers at a point spaced from the point of extrusion while maintaining a bubble of a fluid medium under pressure in the tubing between the point of extrusion and the point of flattening to cause distention thereof; cooling said tubing between the point of extrusion and the point of flattening to set said tubing in the distended condition; passing a continuous length of the set formed seamless tubing through a heated zone while simultaneously introducing and maintaining in the seamless tubing a continuous isolated bubble of a fluid medium to prevent the seamless tubing from collapsing; passing the heated tubing between a pair of rollers and stretching the high density polyethylene film between the two pairs of rollers at least 700% in the longitudinal direction to cause high orientation thereof in said direction, the heat in said zone maintaining the temperature of the thermoplastic coating above its melting point and below its degradation point to preserve its bond to the high density polyethylene film and maintaining the temperature of the high density polyethylene film from about 5° C. to 25° C. below the temperature at which it melts and above the temperature at which it is drawable to cause the longitudinal orientation.

References Cited by the Examiner
UNITED STATES PATENTS

| | | | |
|---|---|---|---|
| 2,227,682 | 1/41 | Wade | 18—57 |
| 2,395,419 | 2/46 | Mitchell | 117—68.5 |
| 2,461,975 | 2/49 | Fuller. | |
| 2,477,614 | 8/49 | Irons | 18—57 |
| 2,594,229 | 4/52 | Snyder. | |
| 2,679,969 | 6/54 | Richter | 229—3.5 |
| 2,699,285 | 1/55 | Bell | 229—51 |
| 2,714,562 | 8/55 | Hechtman | 117—68.5 |
| 2,877,500 | 3/59 | Rainer. | |
| 2,917,217 | 12/59 | Sisson | 229—3.5 X |
| 2,952,395 | 9/60 | Spees | 229—51 |
| 2,956,723 | 10/60 | Tritsch | 229—3.5 X |
| 3,001,644 | 9/61 | Fourness | 229—511 X |

GEORGE O. RALSTON, *Primary Examiner.*

EARLE J. DRUMMOND, *Examiner.*